(12) United States Patent
Kishimoto et al.

(10) Patent No.: US 6,291,612 B1
(45) Date of Patent: *Sep. 18, 2001

(54) PROCESS FOR PREPARING VINYL POLYMER

(75) Inventors: Yasuhisa Kishimoto; Masato Kusakabe, both of Kobe (JP)

(73) Assignee: Kaneko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,541

(22) Filed: Jul. 16, 1998

Related U.S. Application Data

(63) Continuation of application No. 08/872,938, filed on Jun. 11, 1997, now abandoned.

(30) Foreign Application Priority Data

Jun. 26, 1996 (JP) .................................................. 8-186567
Jun. 26, 1996 (JP) .................................................. 8-186568
Jan. 13, 1997 (JP) .................................................... 9-3900

(51) Int. Cl.$^7$ ................................. C08F 4/40; C08F 4/10
(52) U.S. Cl. ....................... 526/135; 526/147; 526/192; 526/204; 526/208; 526/210; 526/217; 526/221; 526/236
(58) Field of Search ..................... 526/135, 204, 526/217, 147, 221, 192, 210, 208

(56) References Cited

U.S. PATENT DOCUMENTS

| | | | | |
|---|---|---|---|---|
| 4,728,706 | * | 3/1988 | Farnham | 526/172 |
| 5,312,871 | * | 5/1994 | Mardare | 525/272 |
| 5,552,502 | * | 9/1996 | Odell | 526/234 |
| 5,763,548 | * | 6/1998 | Matyjaszewski | 526/135 |
| 5,789,487 | * | 8/1998 | Matyjaszewski | 525/301 |
| 5,807,937 | * | 9/1998 | Matyjaszewski | 526/135 |

FOREIGN PATENT DOCUMENTS

| | | |
|---|---|---|
| 96/30421 | 10/1996 | (WO) . |
| wo 96/30421 | 10/1996 | (WO) . |
| 97/18247 | 5/1997 | (WO) . |
| WO 97/18247 | 5/1997 | (WO) . |
| WO 98/01480 | 1/1998 | (WO) . |
| WO 98/40415 | 9/1998 | (WO) . |

OTHER PUBLICATIONS

Jin–Shan Wang et al. "Controlled/"Living "Radical Polymerization. Atom Transfer Radical Polymerization in the Presence of Transition–Metal Complexes" American Chemical Society (1995) 117:5614–5615.

Jin–Shan et al. "Controlled/"Living "Radical Polymerization. Halogen Atom Transfer Radical Polymerization Promoted by a Cu(I)/Cu(II) Redox Process" American Chemical Society (1995) 28:7901–7910.

Timothy E. Pattern et al. "Polymers with Very Low Polydispersities from Atom Transfer Radical Polymerization" Science (1996) 272:866–868.

Nakagawa et al., "The synthesis of Eng Functional polymers by "Living" Radical Polymerization" Polymer Preprints, 37:577–578 (1996).

\* cited by examiner

Primary Examiner—Fred Zitomer
(74) Attorney, Agent, or Firm—Foley & Lardner

(57) ABSTRACT

A vinyl polymer having a controlled molecular weight and narrow molecular weight distribution is prepared by polymerizing a vinyl monomer using an organic halide polymerization initiator in the presence of a cuprous compound catalyst in a solvent containing an organic compound having a dielectric constant of at least 10 at 25° C., or by polymerizing a vinyl monomer using an organic halide polymerization initiator in the presence of a cuprous compound catalyst and also a specific 1,10-phenanthroline compound.

7 Claims, No Drawings

PROCESS FOR PREPARING VINYL POLYMER

This application is a continuation of application Ser. No. 08/872,938, filed Jun. 11, 1997 abandoned.

BACKGROUND OF THE INVENTION

1. Field of the Invention

The present invention relates to a process for preparing a vinyl polymer having a controlled molecular weight and a narrow molecular weight distribution.

2. Description of the Prior Art

Molecular weights and molecular weight distributions of polymers have large influences on properties, such as flow properties, of the polymers. Thus, it is very important to prepare polymers having controlled molecular weights and narrow molecular weight distributions for controlling the properties of the prepared polymers and compositions comprising such the polymers.

A method for the easy preparation of a vinyl polymer having a controlled molecular weight and narrow molecular weight distribution, which is disclosed in J. Am. Chem. Soc., 117, 5614–5615 (1995), Macromolecules, 28, 7901–7910 (1995) and the like, comprises living radically polymerizing a vinyl monomer using an organic halide as a polymerization initiator and a monovalent copper complex which is obtained from a cuprous halide and an electron donating compound such as 2,2'-bipyridyl compounds. This process provides the polymer having the controlled molecular weight and narrow molecular weight distribution when the monomer is styrene, methyl acrylate, etc.

However, the molecular weight distributions of the vinyl polymers prepared by the above process are not still satisfactorily narrow. In particular, the molecular weight distributions of the vinyl polymers are slightly broad when this method is used for polymerizing acrylates (e.g. butyl acrylate, hexyl acrylate, 2-ethylhexyl acrylate, etc.), or methacrylates (e.g. methyl methacrylate, ethyl methacrylate, etc.).

Accordingly, it has been desired to provide a process for preparing vinyl polymers having narrower molecular weight distributions.

SUMMARY OF THE INVENTION

An object of the present invention is to provide a process for preparing a vinyl polymer which has a controlled molecular weight and a narrower molecular weight distribution than the conventional vinyl polymers.

According to the first aspect, the present invention provides a process for preparing a vinyl polymer comprising polymerizing a vinyl monomer using an organic halide as a polymerization initiator in the presence of a cuprous compound as a catalyst in a solvent comprising an organic compound having a dielectric constant of at least 10 at 25° C., preferably a dielectric constant of at least 15 at 25° C.

According to the second aspect, the present invention provides a process for preparing a vinyl polymer comprising polymerizing a vinyl monomer using an organic halide as a polymerization initiator in the presence of a cuprous compound as a catalyst and a 1,10-phenanthroline compound of the formula (I):

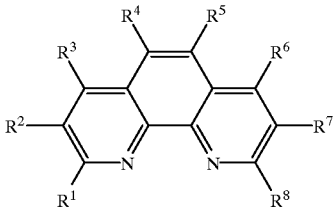

wherein $R^1$, $R^2$, $R^3$, $R^4$, R5, $R^6$, $R^7$ and $R^8$ are the same or different and represent a hydrogen atom, an alkyl group having 1 to 10 carbon atoms, an aryl group having 6 to 10 carbon atoms or an aralkyl group having 7 to 10 carbon atoms.

DETAILED DESCRIPTION OF THE INVENTION

The process of the present invention uses an organic halide as a polymerization initiator. The kind of the organic halide is not limited, and any halide which is used as a polymerization initiator for vinyl monomers may be used. Examples of such the organic halide are carbon tetrachloride, carbon tetrabromide, allyl chloride, allyl bromide, allyl iodide, xylene derivatives (e.g. α,α'-dichloro-o-, m- or p-xylene, α,α'-dibromo-o-, m- or p-xylene, etc.), benzene derivatives (e.g. o-, m- or p-bis(α-chloroethyl) benzene, o-, m- or p-bis(α-bromoethyl)benzene, etc.), α-chloroacetates (e.g. methyl α-chloroacetate, ethyl α-chloroacetate, etc.), α,α-dichloroacetates (e.g. methyl α,α-dichloroacetate, ethyl α,α-dichloroacetate, etc.), α,α,α-trichloroacetates (e.g. methyl α,α,α-trichloroacetate, ethyl α,α,α-trichloroacetate, etc.), α-chloropropionates (e.g. methyl α-chloropropionate, ethyl α-chloropropionate, etc.), α-chloroisobutyrates (e.g. methyl α-chloroisobutyrate, ethyl α-isobutyrate, etc.), α-bromoacetates (e.g. methyl α-bromoacetate, ethyl α-bromoacetate, etc.), α,α-dibromoacetates (e.g. methyl α,α-dibromoacetate, ethyl α,α-dibromoacetate, etc.), α,α,α-tribromoacetates (e.g. methyl α,α,α-tribromoacetate, ethyl α,α,α-tribromoacetate, etc.), α-bromopropionates (e.g. methyl α-bromopropionate, ethyl α-bromopropionate, etc.), α-bromoisobutyrates (e.g. methyl α-bromoisobutyrate, ethyl α-bromoisobutyrate, etc.), and the like. These organic halides may be used independently or in admixture of two or more of them.

The amount of the polymerization initiator may be substantially the same as that in the conventional processes.

The process of the present invention uses a cuprous compound as a catalyst. The kind of the cuprous compound is not limited. Examples of the cuprous compound are cuprous chloride, cuprous bromide, cuprous iodide, cuprous cyanide, and the like.

The amount of the cuprous compound may be the same as in the conventional processes.

The cuprous compound is preferably used together with an electron donating compound. The kind of the electron donating compound is not limited. Examples of the electron donating compound are nitrogen atom-containing heterocyclic compounds such as bipyridyl (bipyridine) compounds (e.g. 2,2'-bipyridyl, 4,4'-dimethyl-2,2'-bipyridyl, etc.), phenanthroline compounds (e.g. 1,10-phenanthroline, 4,7-dimethyl-1,10-phenanthroline, 5,6-dimethyl-1,10-phenanthroline, 3,4,7,8-tetramethyl-1,10-phenanthroline, etc.), and the like.

The amount of the electron donating compound is usually between 0.5 and 5 moles, preferably between 2 and 3 moles, per one mole of the cuprous compound.

The kind of the vinyl monomer which is polymerized by the process of the present invention is not limited. Examples of the vinyl monomer are (meth)acrylates (e.g. methyl (meth)acrylate, ethyl (meth)acrylate, n-propyl (meth) acrylate, isopropyl (meth)acrylate, n-butyl (meth)acrylate, isobutyl (meth)acrylate, tertbutyl (meth)acrylate, n-pentyl (meth)acrylate, n-hexyl (meth)acrylate, cyclohexyl (meth) acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, etc.), styrene and its derivatives (e.g. 2-, 3- or 4-methylstyrene, 2-, 3- or 4-chlorostyrene, 2-, 3- or 4-(chloromethyl)styrene, 2-, 3- or 4-methoxystyrene, 2-, 3- or 4-(methoxycarbonyl)styrene, α-methyl-styrene, etc.), maleic anhydride, and the like. They may be used independently or in admixture of two or more of them.

In one preferred embodiment of the process of the present invention, the vinyl monomer is polymerized in a solvent comprising an organic compound having a dielectric constant of at least 10 measured at 25° C.

The kind of such the organic compound is not limited.

A preferred example of such the organic compound is a carbonyl compound of the formula (II):

$$R^9-CO-R^{10} \qquad (II)$$

wherein $R^9$ and $R^{10}$ are the same or different and represent a hydrogen atom, an alkyl group having 1 to 10 carbon atoms, an aryl group having 6 to 10 carbon atoms or an aralkyl group having 7 to 10 carbon atoms, or $R^9$ and $R^{10}$ forms a cyclic alkyl group together with the carbonyl group.

Specific examples of the carbonyl compound of the formula (II) are acyclic aliphatic ketones (e.g. acetone, 2-butanone, 2- or 3-pentanone, 2-hexanone, 2-heptanone, 4-methyl-2-pentanone, etc.), cyclic aliphatic ketones (e.g. cyclohexanone, 2-, 3- or 4-methylcyclohexanone, etc.), aromatic ketones (e.g. acetophenone, 2-, 3- or 4-methylacetophenone, etc.), and the like.

Another example of such the organic compound is a nitro compound of the formula (III):

$$R^{11}-NO_2 \qquad (III)$$

wherein $R^{11}$ is an alkyl group having 1 to 10 carbon atoms, an aryl group having 6 to 10 carbon atoms or an aralkyl group having 7 to 10 carbon atoms.

Specific examples of the nitrocompound of the formula (III) are nitromethane, nitroethane, nitropropane, nitrobenzene, and the like.

A further example of such the compound is a nitrile compound of the formula (IV):

$$R^{11}-CN \qquad (IV)$$

wherein $R^{11}$ is the same as defined above.

Specific examples of the nitrile compound of the formula (IV) are acetonitrile, propionitrile, benzonitrile, and the like.

A still further examples of such the organic compound is an alcohol of the formula (V):

$$R^{12}-OH \qquad (V)$$

wherein $R^{12}$ is a hydrogen atom, an alkyl group having 1 to 10 carbon atoms, an aryl group having 6 to 10 carbon atoms or an aralkyl group having 7 to 10 carbon atoms.

Specific examples of the alcohol of the formula (V) are methanol, ethanol, 1- or 2-propanol, 1-butanol, cyclohexanol, benzyl alcohol, and the like.

The carbonyl compound (II), nitro compound (III), nitrile compound (IV) and alcohol compound (V) may be used independently or in admixture of two or more of them.

The organic compound having the dielectric constant of at least 10 measured at 25° C. may be used together with at least one other solvent.

The kind of the other solvent is not limited. Preferable example of the other solvent are organic compounds such as hexane, toluene, ethyl acetate, tetrahydrofurane, etc.

The amount of the organic compound having the dielectric constant of at least 10 at 25° C. is preferably between 10 to 100 vol. % of the whole solvent, when the other solvent is used. If the amount of such the organic solvent is less than 10 vol. %, the obtained vinyl polymer may have a wide molecular weight distribution.

In the process of the present invention, the whole volume of the solvent is not limited. Preferably, the total amount of the solvent is between 0.5 and 10 times the volume of the vinyl monomer for achieving the suitable reaction rate.

In the present invention, the polymerization temperature is adequately selected according to the kind of the vinyl monomer, and other conditions. In general, the polymerization temperature is between 60 and 150° C.

In another preferred embodiment of the present invention, the polymerization is carried out in the presence of a 1,1-phenanthroline compound of the above formula (I).

When the vinyl monomer is polymerized in the presence of the phenanthroline compound of the formula (I), the obtained vinyl polymer has the controlled molecular weight and narrow molecular weight distribution.

Unexpectedly, it has been found that the 1,10-phenanthroline compound (I) achieves the higher polymerization rate than the conventional electron donating compounds which coordinate on a cuprous catalyst, such as 2,2'-bipyridyl compounds. The higher polymerization rate is advantageous from the economical point of view in the industrial scale production of the vinyl polymers.

When the polymerization is carried out in the presence of the 1,10-phenanthroline compound (I), the organic compound having the dielectric constant of at least 10 at 25° C. is preferably used as the solvent, although other solvent may be used.

Specific examples of the 1,10-phenanthroline compound (I) are 1,10-phenanthroline, 2-, 3-, 4- or 5-methyl-1,10-phenanthroline, 2,3-, 2,4-, 2,5-, 2,6-, 2,7-, 2,8-, 3,4-, 3,5-, 3,6-, 3,7-, 3,8-, 4,5-, 4,6-, 4,7- or 5,6-dimethyl-1,10-phenanthroline, 2,3,4-, 2,3,5-, 2,3,6-, 2,3,7-, 2,3,8-, 3,4,5-, 3,4,6-, 3,4,7-, 3,5,8- or 4,5,7-trimethyl-1,10-phenanthroline, 3,4,7,8- or 4,5,6,7-1,10-phenanthroline, 4,7-diphenyl-1,10-phenanthroline, 4,7-benzyl-1,10-phenanthroline, and the like. They may be used independently or in admixture of two or more of them.

The amount of the 1,1-phenanthroline compound of the formula (I) is usually between 0.5 and 5 moles, preferably between 2 and 3 moles, per one mole of the cuprous compound.

The vinyl polymer prepared by the process of the present invention usually has a number average molecular weight of between 500 and 100,000. The molecular weight distribution achieved by the process of the present invention is usually between 1 and 1.5 in terms of Mw/Mn.

The vinyl polymer prepared by the process of the present invention is expected to have a smaller viscosity than vinyl polymers which are obtained by the conventional processes and have the same backbone and molecular weight, since it has the narrow molecular weight distribution.

EXAMPLES

The present invention will be illustrated by the following Examples, which will not limit the scope of the present invention in any way.

In the Examples, the following commercially available reagents were used without purification:

Methyl acrylate: available from TOKYO KASEI, guaranteed reagent;

Butyl acrylate: available from WAKO JUNYAKU, purity of 99.9%;

Ethyl α-bromopropionate: available from TOKYO KASEI;

α,α'-Dibromo-p-xylene: available from WAKO JUNYAKU, guaranteed reagent;

2,2'-Bipyridyl, 1,10-phenanthroline, 4,7-dimethyl-1,10-phenanthroline, 5,6-dimethyl-1,10-phenanthroline, and 3,4,7,8-tetramethyl-1,10-phenanthroline: all available from TOKYO KASEI.

Also the following commercially available solvents were used without purification:

Toluene: available from WAKO JUNYAKU, guaranteed reagent;

Ethyl acetate: available from WAKO JUNYAKU, guaranteed reagent;

Acetone and 4-methyl-2-pentanone: both available from WAKO JUNYAKU, guaranteed reagent;

Ethanol: available from WAKO JUNYAKU, guaranteed reagent;

Nitroethane: available from WAKO JUNYAKU, extra pure grade reagent;

Acetonitrile: available from WAKO JUNYAKU, guaranteed reagent;

Benzonitrile: available from ISHIZU SEIYAKU, guaranteed reagent.

Example 1

In a pressure-resistant 30 ml glass reactor, butyl acrylate (10 ml, 9.94 g, 69.8 mmol), α,α'-dibromo-p-xylene (370 mg, 1.4 mmol), cuprous bromide (200 mg, 1.4 mmol), 2,2'-bipyridyl (652 mg, 4.2 mmol) and acetone (dielectric constant of 20.70 at 25° C.) (10 ml) were charged, and the interior of the reactor was evacuated three times to purge dissolved oxygen. Then, the reactor was sealed.

The mixture was heated to 130° C. and reacted for 3 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (4.26 g) was obtained. The polymer yield was 47.6%.

The number average molecular weight of the obtained polymer was 3900, and the polydispersity (Mw/Mn) was 1.17, both measured by GPC (as converted to polystyrene).

Example 2

In a pressure-resistant 30 ml glass reactor, methyl acrylate (3.1 ml, 3.0 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and 4-methyl-2-pentanone (dielectric constant of 13.11 at 25° C.) (3.14 ml) were charged, and dissolved oxygen was purged by bubbling nitrogen gas for 10 minutes. Then, the reactor was sealed.

The mixture was heated to 130° C. and reacted for 0.5 hour. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(methyl acetate) (2.07 g) was obtained. The polymer yield was 68.8%.

The number average molecular weight of the obtained polymer was 3900, and the polydispersity (Mw/Mn) was 1.31, both measured by GPC (as converted to polystyrene).

Example 3

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and acetonitrile (dielectric constant of 36.0 at 25° C.) (5 ml) were charged, and the interior of the reactor was evacuated three times to purge dissolved oxygen. Then, the reactor was sealed.

The mixture was heated to 150° C. and reacted for 9 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (1.41 g) was obtained. The polymer yield was 31.5%.

The number average molecular weight of the obtained polymer was 2800, and the polydispersity (Mw/Mn) was 1.21, both measured by GPC (as converted to polystyrene).

Example 4

In a pressure-resistant 30 ml glass reactor, butyl acrylate (5 ml, 4.47 g, 34.9 mmol), ethyl α-bromopropionate (0.090 ml, 0.70 mmol), cuprous bromide (100 mg, 0.70 mmol), 2,2'-bipyridyl (326 mg, 2.1 mmol) and acetonitrile (5 ml) were charged, and the interior of the reactor was evacuated three times to purge dissolved oxygen. Then, the reactor was sealed.

The mixture was heated to 130° C. and reacted for 5 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (2.95 g) was obtained. The polymer yield was 66.0%.

The number average molecular weight of the obtained polymer was 3600, and the polydispersity (Mw/Mn) was 1.13, both measured by GPC (as converted to polystyrene).

Example 5

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol), acetonitrile (5 ml) and ethyl acetate (dielectric constant of 6.02 at 25° C.) (2.5 ml) were charged, and the interior of the reactor was evacuated three times to purge dissolved oxygen. Then, the reactor was sealed.

The mixture was heated to 130° C. and reacted for 6 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (2.83 g) was obtained. The polymer yield was 63.3%.

The number average molecular weight of the obtained polymer was 5100, and the polydispersity (Mw/Mn) was 1.15, both measured by GPC (as converted to polystyrene).

Example 6

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol), acetonitrile (1 ml) and ethyl acetate (4 ml) were charged, and the interior of the reactor was evacuated three times to purge dissolved oxygen. Then, the reactor was sealed.

The mixture was heated to 130° C. and reacted for 2 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (3.79 g) was obtained. The polymer yield was 84.8%.

The number average molecular weight of the obtained polymer was 5700, and the polydispersity (Mw/Mn) was 1.26, both measured by GPC (as converted to polystyrene).

Example 7

In a pressure-resistant 30 ml glass reactor, butyl acrylate (5 ml, 4.47 g, 34.9 mmol), ethyl α-bromopropionate (0.090 ml, 0.70 mmol), cuprous bromide (100 mg, 0.70 mmol), 2,2'-bipyridyl (326 mg, 2.1 mmol) and benzonitrile (dielectric constant of 25.20 at 25° C.) (5 ml) were charged, and the interior of the reactor was evacuated three times to purge dissolved oxygen. Then, the reactor was sealed.

The mixture was heated to 130° C. and reacted for 2 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (2.48 g) was obtained. The polymer yield was 55.5%.

The number average molecular weight of the obtained polymer was 3600, and the polydispersity (Mw/Mn) was 1.16, both measured by GPC (as converted to polystyrene).

Example 8

In a pressure-resistant 30 ml glass reactor, butyl acrylate (5 ml, 4.47 g, 34.9 mmol), ethyl α-bromopropionate (0.090 ml, 0.70 mmol), cuprous bromide (100 mg, 0.70 mmol), 2,2'-bipyridyl (326 mg, 2.1 mmol) and nitroethane (dielectric constant of 28.06 at 30° C.) (5 ml) were charged, and the interior of the reactor was evacuated three times to purge dissolved oxygen. Then, the reactor was sealed.

The mixture was heated to 130° C. and reacted for 6 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (1.97 g) was obtained. The polymer yield was 44.1%.

The number average molecular weight of the obtained polymer was 2000, and the polydispersity (Mw/Mn) was 1.23, both measured by GPC (as converted to polystyrene).

Example 9

In a pressure-resistant 30 ml glass reactor, methyl acrylate (3.1 ml, 3.0 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol), acetonitrile (0.63 ml) and ethyl acetate (2.51 ml) were charged, and the interior of the reactor was evacuated three times to purge dissolved oxygen. Then, the reactor was sealed.

The mixture was heated to 130° C. and reacted for 2 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(methyl acetate) (2.09 g) was obtained. The polymer yield was 70.0%.

The number average molecular weight of the obtained polymer was 4300, and the polydispersity (Mw/Mn) was 1.18, both measured by GPC (as converted to polystyrene).

Example 10

In a pressure-resistant 30 ml glass reactor, methyl acrylate (3.1 ml, 3.0 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and ethanol (dielectric constant of 24.55 at 25° C.) (0.63 ml) were charged, and the interior of the reactor was evacuated three times to purge dissolved oxygen. Then, the reactor was sealed.

The mixture was heated to 130° C. and reacted for 2 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(methyl acetate) (2.01 g) was obtained. The polymer yield was 67.0%.

The number average molecular weight of the obtained polymer was 3600, and the polydispersity (Mw/Mn) was 1.37, both measured by GPC (as converted to polystyrene).

Comparative Example 1

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol) and 2,2'-bipyridyl (326 mg, 2.1 mmol)were charged, and the interior of the reactor was evacuated three times to purge dissolved oxygen. Then, the reactor was sealed.

The mixture was heated to 130° C. and reacted for 1 hour. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (4.45 g) was obtained. The polymer yield was 99.6%.

The number average molecular weight of the obtained polymer was 6300, and the polydispersity (Mw/Mn) was 1.75, both measured by GPC (as converted to polystyrene).

Comparative Example 2

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and ethyl acetate (dielectric constant of 6.02) (5 ml) were charged, and the interior of the reactor was evacuated three times to purge dissolved oxygen. Then, the reactor was sealed.

The mixture was heated to 130° C. and reacted for 6 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (4.31 g) was obtained. The polymer yield was 96.4%.

The number average molecular weight of the obtained polymer was 6300, and the polydispersity (Mw/Mn) was 1.77, both measured by GPC (as converted to polystyrene).

Comparative Example 3

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and toluene (dielectric constant of 2.38 at 25° C.) (5 ml) were charged, and the interior of the reactor was evacuated three times to purge dissolved oxygen. Then, the reactor was sealed.

The mixture was heated to 130° C. and reacted for 4 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (4.41 g) was obtained. The polymer yield was 98.7%.

The number average molecular weight of the obtained polymer was 5800, and the polydispersity (Mw/Mn) was 1.92, both measured by GPC (as converted to polystyrene).

The results of Examples 1 through 10 and Comparative Examples 1, 2 and 3 are summarized in Table 1, in which "BA", "MA", "Bromoxylene", "Bromoester" and "Bipyridyl" mean butyl acrylate, methyl acrylate, α,α'-dibromo-p-xylene, ethyl α-bromo-propionate, and 2,2'-bipyridyl, respectively.

solvents having the high dielectric constant had the narrow molecular weight distribution (Mw/Mn).

Example 11

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 1,10-phenanthroline (378 mg, 2.1 mmol) and acetonitrile (5 ml) were charged, and the interior of the reactor was evacuated three times to purge dissolved oxygen. Then, the reactor was sealed.

The mixture was heated to 130° C. and reacted for 6 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (2.27 g) was obtained. The polymer yield was 50.8%.

The number average molecular weight of the obtained polymer was 3500, and the polydispersity (Mw/Mn) was 1.21, both measured by GPC (as converted to polystyrene).

Example 12

In a pressure-resistant 30 ml glass reactor, butyl acrylate (2.5 ml, 2.24 g, 17.5 mmol), α,α'-dibromo-p-xylene (93 mg, 0.35 mmol), cuprous bromide (50 mg, 0.35 mmol), 4,7-dimethyl-1,10-phenanthroline (219 mg, 1.05 mmol) and acetonitrile (2.5 ml) were charged, and the interior of the reactor was evacuated three times to purge dissolved oxygen. Then, the reactor was sealed.

TABLE 1

| Ex. No. | Monomer (mmol) | Initiator (mmol) | Catalysts (mmol) | Solvent (ml) | Reaction temp. (° C.) | Reaction time (hr) | Polymer Yield (%) | Mw/Mn |
|---|---|---|---|---|---|---|---|---|
| 1 | BA (69.8) | Bromoxylene (1.4) | CuBr/bipyridyl (1.4/4.2) | Acetone (10) | 130 | 3 | 47.6 | 1.17 |
| 2 | MA (34.9) | Bromoxylene (0.7) | CuBr/bipyridyl (0.7/2.1) | 4-Methyl-2-pentanone (3.14) | 130 | 0.5 | 68.8 | 1.31 |
| 3 | BA (34.9) | Bromoxylene (0.7) | CuBr/bipyridyl (0.7/2.1) | Acetonitrile (5) | 150 | 9 | 31.5 | 1.21 |
| 4 | BA (34.9) | Bromoester (0.7) | CuBr/bipyridyl (0.7/2.1) | Acetonitrile (5) | 130 | 5 | 66.0 | 1.13 |
| 5 | BA (34.9) | Bromoxylene (0.7) | CuBr/bipyridyl (0.7/2.1) | Acetonitrile/ethyl acetate (2.5/2.5) | 130 | 6 | 63.3 | 1.15 |
| 6 | BA (34.9) | Bromoxylene (0.7) | CuBr/bipyridyl (0.7/2.1) | Acetonitrile/ethyl acetate (1/4) | 130 | 2 | 84.8 | 1.26 |
| 7 | BA (34.9) | Bromoester (0.7) | CuBr/bipyridyl (0.7/2.1) | Benzonitrile (5) | 130 | 2 | 55.5 | 1.16 |
| 8 | BA (34.9) | Bromoester (0.7) | CuBr/bipyridyl (0.7/2.1) | Nitroethane (5) | 130 | 6 | 44.1 | 1.23 |
| 9 | MA (34.9) | Bromoxylene (0.7) | CuBr/bipyridyl (0.7/2.1) | Acetonitrile/ethyl acetate (0.63/2.51) | 130 | 2 | 70.0 | 1.18 |
| 10 | MA (34.9) | Bromoxylene (0.7) | CuBr/bipyridyl (0.7/2.1) | Ethanol/ethyl acetate (0.63/2.51) | 130 | 2 | 67.0 | 1.37 |

| Com. Ex. No. | Monomer (mmol) | Initiator (mmol) | Catalysts (mmol) | Solvent (ml) | Reaction temp. (° C.) | Reaction time (hr) | Polymer Yield (%) | Mw/Mn |
|---|---|---|---|---|---|---|---|---|
| C.1 | BA (34.9) | Bromoxylene (0.7) | CuBr/bipyridyl (0.7/2.1) | — | 130 | 1 | 99.6 | 1.75 |
| C.2 | BA (34.9) | Bromoxylene (0.7) | CuBr/bipyridyl (0.7/2.1) | Ethyl acetate (5) | 130 | 6 | 96.4 | 1.77 |
| C.3 | BA (34.9) | Bromoxylene (0.7) | CuBr/bipyridyl (0.7/2.1) | Toluene (5) | 130 | 4 | 98.7 | 1.92 |

As seem from the comparison of the results of Examples 1 through 10 and those of Comparative Examples 1, 2 and 3, the polymers obtained by the polymerization in the The mixture was heated to 130° C. and reacted for 3 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (0.54 g) was obtained. The polymer yield was 24.1%.

The number average molecular weight of the obtained polymer was 2100, and the polydispersity (Mw/Mn) was 1.36, both measured by GPC (as converted to polystyrene).

Example 13

In a pressure-resistant 30 ml glass reactor, butyl acrylate (2.5 ml, 2.24 g, 17.5 mmol), α,α'-dibromo-p-xylene (93 mg, 0.35 mmol), cuprous bromide (50 mg, 0.35 mmol), 5,6-dimethyl-1,10-phenanthroline (219 mg, 1.05 mmol) and acetonitrile (2.5 ml) were charged, and the interior of the reactor was evacuated three times to purge dissolved oxygen. Then, the reactor was sealed.

The mixture was heated to 130° C. and reacted for 5 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (2.66 g) was obtained. The polymer yield was 118.8%.

The number average molecular weight of the obtained polymer was 7400, and the polydispersity (Mw/Mn) was 1.37, both measured by GPC (as converted to polystyrene).

Example 14

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 3,4,7,8-tetramethyl-1,10-phenanthroline (496 mg, 2.1 mmol) and acetonitrile (5 ml) were charged, and the interior of the reactor was evacuated three times to purge dissolved oxygen. Then, the reactor was sealed.

The mixture was heated to 130° C. and reacted for 6 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (4.38 g) was obtained. The polymer yield was 98.0%.

The number average molecular weight of the obtained polymer was 7800, and the polydispersity (Mw/Mn) was 1.49, both measured by GPC (as converted to polystyrene).

Example 15

In a pressure-resistant 30 ml glass reactor, butyl acrylate (5 ml, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.1 mmol) and acetonitrile (5 ml) were charged, and the interior of the reactor was evacuated three times to purge dissolved oxygen. Then, the reactor was sealed.

The mixture was heated to 130° C. and reacted for 5 hours. The reaction mixture was diluted with ethyl acetate, and washed with 10% hydrochloric acid three times and with a brine one time.

The organic layer was dried over anhydrous sodium sulfate, and the solvent was distilled off under reduced pressure, and poly(butyl acrylate) (0.65 g) was obtained. The polymer yield was 14.5%.

The number average molecular weight of the obtained polymer was 1100, and the polydispersity (Mw/Mn) was 1.36, both measured by GPC (as converted to polystyrene).

The results of Examples 11 through 15 are summarized in Table 2, in which "Phenanthroline A" "Phenanthroline B", "Phenanthroline C", "Phenanthroline D" and "Bipyridyl" mean "1,10-phenanthroline, 4,7-dimethyl-1,10-phenanthroline, 5,6-dimethyl-1,10-phenanthroline, 3,4,7,8-tetramethyl-1,10-phenanthroline, and 2,2'-bipyridyl, respectively.

TABLE 2

| Ex. No. | Monomer (mmol) | Initiator (mmol) | Catalysts (mmol) | Solvent (ml) | Reaction temp. (° C.) | Reaction time (hr) | Polymer Yield (%) | Mw/Mn |
|---|---|---|---|---|---|---|---|---|
| 11 | BA (34.9) | Bromoxylene (0.7) | CuBr/phenanthroline A (0.7/2.1) | Acetonitrile (5) | 130 | 6 | 50.8 | 1.21 |
| 12 | BA (17.5) | Bromoxylene (0.35) | CuBr/phenanthroline B (0.35/1.05) | Acetonitrile (2.5) | 130 | 3 | 24.1 | 1.36 |
| 13 | BA (17.5) | Bromoxylene (0.35) | CuBr/phenanthroline C (0.35/1.05) | Acetonitrile (2.5) | 130 | 5 | 111.8 | 1.37 |
| 14 | BA (34.9) | Bromoxylene (0.7) | CuBr/phenanthroline D (0.7/2.1) | Acetonitrile (5) | 130 | 6 | 98.0 | 1.49 |
| 15 | BA (34.9) | Bromoxylene (0.7) | CuBr/bipyridyl (0.7/2.1) | Acetonitrile (5) | 130 | 5 | 14.5 | 1.36 |

As seen from the results in Table 2, the use of the 1,10-phenanthroline compounds provided the polymers having the molecular weight distribution which is the same as or smaller than that achieved by the use of the bipyridyl compound. Furthermore, it is seen from the data of reaction time and polymer yield that the 1,10-phenanthroline compounds achieved the higher polymerization reaction rates than the bipyridyl compound.

What is claimed is:

1. A process for preparing a vinyl polymer comprising polymerizing a vinyl monomer selected from the group consisting of acrylates and methacrylates using an organic halide as a polymerization initiator in the presence of a cuprous compound as a catalyst in a solvent comprising an organic compound having a dielectric constant of at least 15 at 25° C., wherein an amount of said organic compound is between 10 to 100% by volume of the whole solvent.

2. A process according to claim 1, wherein said organic compound having the dielectric constant of at least 15 at 25° C. is at least one compound selected from the group consisting of:

a compound of a carbonyl compound of the formula (II):

  (II)

wherein $R^9$ and $R^{10}$ are the same or different and represent a hydrogen atom, an alkyl group having 1 to 10 carbon atoms, an aryl group having 6 to 10 carbon atoms or an aralkyl group having 7 to 10 carbon atoms, or $R^9$ and $R^{10}$ forms a cyclic alkyl group together with the carbonyl group;

a nitro compound of the formula (III):

  (III)

wherein $R^{11}$ is an alkyl group having 1 to 10 carbon atoms, an aryl group having 6 to 10 carbon atoms or an aralkyl group having 7 to 10 carbon atoms;

a nitrile compound of the formula (IV):

  (IV)

wherein $R^{11}$ is the same as defined above; and an alcohol of the formula (V):

  (V)

wherein $R^{12}$ is a hydrogen atom, an alkyl group having 1 to 10 carbon atoms, an aryl group having 6 to 10 carbon atoms or an aralkyl group having 7 to 10 carbon atoms.

3. A process according to claim 1, wherein an amount of said organic compound having the dielectric constant of at least 15 at 25° C. is between 10 to 100 vol. % of the whole solvent.

4. A process as claimed in claim 1, wherein in addition to the presence of the cuprous compound there is also a 1,10-phenanthroline compound of the formula (I):

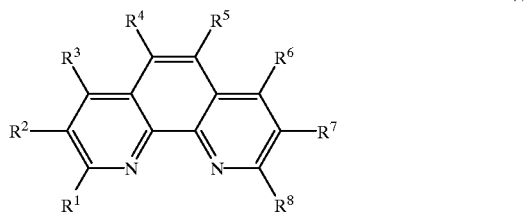

wherein $R^1$, $R^2$, $R^3$, $R^4$, $R^5$, $R^6$, $R^7$ and $R^8$ are the same or different and represent a hydrogen atom, an alkyl group having 1 to 10 carbon atoms, an aryl group having 6 to 10 carbon atoms or an aralkyl group having 7 to 10 carbon atoms.

5. A process as claimed in claim 1, wherein the vinyl monomer is selected from the group consisting of methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, cyclohexyl methacrylate, n-heptyl methacrylate, n-octyl methacrylate, 2-ethylhexyl methacrylate, nonyl methacrylate, decyl methacrylate, dodecyl methyacrylate, methyl acrylate, ethyl acrylate, n-propyl acrylate, isoropyl acrylate, n-butyl acrylate, isobutyl acrylate, tert-butyl acrylate, n-pentyl acrylate, n-hexyl acrylate, cyclohexyl acrylate, n-heptyl acrylate, n-octyl acrylate, 2-ethylhexyl acrylate, nonyl acrylate, decyl acrylate, and dodecyl acrylate.

6. A process as claimed in claim 1, wherein the vinyl monomer is selected from the group consisting of methyl acrylate, methyl methacrylate, n-butyl acrylate, and n-butyl methacrylate.

7. A process for preparing a vinyl polymer comprising polymerizing a vinyl monomer selected from the group consisting of acrylates and methacrylates using an organic halide as a polymerization initiator in the presence of a cuprous compound as a catalyst in a solvent consisting essentially of an organic compound having a dielectric constant of at least 15 at 25° C.

* * * * *

UNITED STATES PATENT AND TRADEMARK OFFICE
CERTIFICATE OF CORRECTION

PATENT NO.      : 6,291,612 B1
DATED           : September 18, 2001
INVENTOR(S)     : Yasuhisa Kishimoto et al.

It is certified that error appears in the above-identified patent and that said Letters Patent is hereby corrected as shown below:

<u>Title page,</u>
Item [73], should read as follows: -- [73] Kaneka Corporation, Osaka (JP) --

Signed and Sealed this

Twenty-seventh Day of August, 2002

Attest:

Attesting Officer

JAMES E. ROGAN
*Director of the United States Patent and Trademark Office*